United States Patent
Choi et al.

(10) Patent No.: US 9,285,285 B2
(45) Date of Patent: Mar. 15, 2016

(54) SENSOR UNIT FOR MEASURING BRAKE FORCE OF PARKING CABLE AND ELECTRONIC PARKING BRAKE WITH THE SAME

(71) Applicant: Mando Corporation, Gyeonggi-do (KR)

(72) Inventors: Wook Jin Choi, Seoul (KR); Jae Hyun Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 4 days.

(21) Appl. No.: 13/676,771

(22) Filed: Nov. 14, 2012

(65) Prior Publication Data
US 2013/0313055 A1 Nov. 28, 2013

(30) Foreign Application Priority Data
Nov. 14, 2011 (KR) .......................... 10-2011-0118158

(51) Int. Cl.
| | |
|---|---|
| *G01L 5/28* | (2006.01) |
| *B60T 13/74* | (2006.01) |
| *G01L 1/12* | (2006.01) |
| *G01L 1/04* | (2006.01) |

(Continued)

(52) U.S. Cl.
CPC . *G01L 5/28* (2013.01); *B60T 7/107* (2013.01); *B60T 13/746* (2013.01); *G01L 1/042* (2013.01); *G01L 1/122* (2013.01); *G01L 5/103* (2013.01)

(58) Field of Classification Search
CPC ........... G01L 1/122; G01L 1/042; G01L 5/28; G01L 5/103; B60T 7/107; B60T 13/746

USPC .......................................... 188/156, 158, 159
See application file for complete search history.

(56) References Cited

U.S. PATENT DOCUMENTS

| | | | | |
|---|---|---|---|---|
| 5,590,744 A * | 1/1997 | Belmond | ................ | B60T 7/107 188/2 D |
| 7,490,699 B2 * | 2/2009 | Gil | .......................... | B60T 7/107 188/1.11 R |

(Continued)

FOREIGN PATENT DOCUMENTS

| | | |
|---|---|---|
| CN | 101018696 | 8/2007 |
| CN | 101148168 | 3/2008 |

(Continued)

OTHER PUBLICATIONS

Chinese Office Action dated Jul. 3, 2014 corresponding to Chinese Application No. 201210457504.7; 7 pages.

*Primary Examiner* — Anna Momper
*Assistant Examiner* — San Aung
(74) *Attorney, Agent, or Firm* — Hauptman Ham, LLP

(57) ABSTRACT

Disclosed is a sensor unit having a simple sensor structure to detect intensity of force applied to a parking cable upon braking a vehicle and an electronic parking brake with the same. The disclosed sensor unit includes a sensor housing, in which a Hall IC is installed to sense variation of magnetic force caused by displacement of a magnet, a magnet housing arranged to be movable within the sensor housing, the magnet being installed in the magnet housing, and an elastic member arranged between the magnet housing and the sensor housing, to elastically support the magnet housing. The magnet housing is coupled to a power conversion unit to operate for pulling of the parking cable or release of the pulling.

5 Claims, 5 Drawing Sheets

(51) Int. Cl.
  *G01L 5/10* (2006.01)
  *B60T 7/10* (2006.01)

(56) References Cited

U.S. PATENT DOCUMENTS 8,091,688 B2 * 1/2012 Reitmeier ............... B60T 7/085
  188/156
2005/0173209 A1 * 8/2005 Bastholm ............ F16H 25/2454
  188/156
2009/0247364 A1 * 10/2009 Sano ..................... B60T 13/746
  477/197
2010/0219029 A1 * 9/2010 Deutloff ................. B60T 7/085
  188/2 D
2011/0308902 A1 * 12/2011 Huang .................... B60T 7/107
  188/2 D

FOREIGN PATENT DOCUMENTS

| KR | 1020100103918 | 9/2010 |
| KR | 1020110055802 A | 5/2011 |
| KR | 1020110062633 A | 6/2011 |

* cited by examiner

SENSOR UNIT FOR MEASURING BRAKE FORCE OF PARKING CABLE AND ELECTRONIC PARKING BRAKE WITH THE SAME

CROSS-REFERENCE TO RELATED APPLICATIONS

This application claims the benefit of Korean Patent Application No. P2011-118158, filed on Nov. 14, 2011 in the Korean Intellectual Property Office, the disclosure of which is incorporated herein by reference.

BACKGROUND

1. Field

Embodiments of the present invention relate to a sensor unit having a simple sensor structure to detect intensity of force applied to a parking cable upon braking a vehicle and an electronic parking brake with the same.

2. Description of the Related Art

Generally, an electronic parking brake (EPB) is a parking brake in which driving of the parking brake is electronically controlled. That is, the EPB applies brake force to wheels of a vehicle in an electronically controlled manner, to prevent the wheels from rotating.

Such an EPB includes a force sensor to sense tension exerted on a parking cable and displacement of the parking cable. The force sensor includes a magnet and a Hall IC. The Hall IC senses variation of electric field generated by the magnet, and outputs a sensing signal.

FIG. 1 is a sectional view illustrating a coupled state of a power conversion unit 10 and a force sensor 20 in a conventional electronic parking brake.

Referring to FIG. 1, the force sensor 20 is mounted to the power conversion unit 10, which converts rotation into rectilinear motion, in order to measure intensity of force exerted on a parking cable C.

The power conversion unit 10 is connected to a reduction gear unit (not shown) to reduce rotation speed of a motor (not shown), in order to convert rotation of the motor into a rectilinear motion. The power conversion unit 10 includes a screw member 11 connected, at one end thereof, with the parking cable C, a nut member 12 to move along an axial direction of the screw member 11 relative to the screw member 11, and a gear member 13 coupled to an outer peripheral surface of the nut member 12, to rotate together with the nut member 12.

The nut member 12 has a hollow structure having an axial hole. The screw member 11 is threadedly coupled to the axial hole of the nut member 12 at one end of the nut member 12, to move relative to the nut member 12 in accordance with rotation of the nut member 12, and thus to actuate the parking cable C. The force sensor 20 is mounted to the other end of the nut member 12, to measure brake force exerted on the parking cable C.

As shown in FIG. 2, the force sensor 20 includes a sensor housing 21, in which a Hall IC 22 to sense variation of magnetic force caused by displacement of a magnet 24, a latch 26 fixed to one side of the sensor housing 21, and a magnet housing 23 disposed within the sensor housing 21. The magnet 24 is installed in the magnet housing 23. The force sensor 20 also includes an elastic member 25 to elastically support the sensor housing 21 between the magnet housing 23 and the sensor housing 21.

The magnet housing 23 has a portion extending outwardly of the sensor housing 21 through the other side of the sensor housing 21. The extension portion of the magnet housing 23 functions to mount the magnet housing 23. That is, the portion of the magnet housing 23 exposed outwardly of the sensor housing 21 is mounted to a housing (not shown), which forms an outer appearance of the electronic parking brake, by a housing support 27.

The latch 26 is mounted to the sensor housing 21 such that a portion of the latch 26 is protruded outwardly of the sensor housing 21 through one side of the sensor housing 21. The latch 26 is connected to the other end of the nut member 12 by a bearing module 30. Thus, the sensor housing 21 is moved by the latch 26 in accordance with movement of the nut member 12.

The bearing module 30 includes a connecting shaft 32 connected to the nut member 12, a bearing 33 fitted around the connecting shaft 32, and a bearing housing 31 to enclose the latch 26 as well as the bearing 33.

The bearing housing 31 holds the portion of the latch 26 protruded from the sensor housing 21. Thus, when the nut member 12 moves relative to the screw member 11, the sensor housing 21 is moved together with the latch 26 because the rotation and axial displacement of the nut member 12 are converted into rectilinear motion by the bearing 33. In accordance with movement of the latch 26, the sensor housing 21 is moved. However, the magnet housing 23 is prevented from moving by the housing support 27. Accordingly, relative displacement is generated between the magnet 24 and the Hall IC 22. The force sensor 20 detects intensity of force exerted on the parking cable C, based on the relative displacement between the magnet 24 and the Hall IC 22.

In the above-mentioned force sensor 20, however, the bearing module 30 is installed between the power conversion unit 10 and the force sensor 20, to convert rotation into rectilinear motion for movement of the sensor housing 21, in order to measure intensity of force exerted on the parking cable C. In this regard, the force sensor 20 requires a complex assembly structure for measurement of the braking force of the parking cable C.

Furthermore, the structure of the force sensor 20 and the structure of the electronic parking brake become more complex due to the structure of the latch 26 installed to connect the bearing module 30 and force sensor 20 and the structure of the housing support 27 separately provided to maintain the magnet housing 23 in a fixed state for displacement measurement of the force sensor 20. As a result, the number of elements to be assembled is increased, and the number of assembly processes is increased.

SUMMARY

Therefore, it is an aspect of the present invention to provide a sensor unit for measuring braking force applied to a parking cable, which has simple sensor driving and coupling structures, and an electronic parking brake including the same.

Additional aspects of the invention will be set forth in part in the description which follows and, in part, will be obvious from the description, or may be learned by practice of the invention.

In accordance with one aspect of the present invention, a sensor unit for detecting intensity of force exerted on a parking cable upon braking a vehicle includes a sensor housing, in which a Hall IC is installed to sense variation of magnetic force caused by displacement of a magnet, a magnet housing arranged to be movable within the sensor housing, the magnet being installed in the magnet housing, and an elastic member arranged between the magnet housing and the sensor housing, to elastically support the magnet housing, wherein the magnet housing is coupled to a power conversion unit to operate for pulling of the parking cable or release of the pulling.

The magnet housing may include a magnet support, at which the magnet is installed, and a shaft coupled to the magnet support, the shaft having a portion protruded outwardly of the sensor housing through one side of the sensor housing.

A fitting groove may be formed at the portion of the shaft protruded outwardly of the sensor housing, and a bearing is fitted around the fitting groove.

In accordance with another aspect of the present invention, an electronic parking brake includes a parking cable connected to a brake to apply brake force to wheels of a vehicle, a motor to generate driving force to actuate the parking cable, a reduction gear unit connected to the motor, to reduce rotation speed of the motor, for generation of torque, a power conversion unit comprising a screw member, to which the parking cable is connected, a nut member to move along an axial direction of the screw member relative to the screw member, and a gear member coupled to an outer peripheral surface of the nut member and connected to the reduction gear unit, to rotate together with the nut member, and a sensor unit connected to the power conversion unit, to measure the brake force applied to the parking cable, wherein the sensor unit includes a sensor housing, in which a Hall IC is installed to sense variation of magnetic force caused by displacement of a magnet, a magnet housing arranged to be movable within the sensor housing, the magnet being installed in the magnet housing, and an elastic member arranged between the magnet housing and the sensor housing, to elastically support the magnet housing.

The magnet housing may include a magnet support, at which the magnet is installed, and a shaft coupled to the magnet support, the shaft having a portion protruded outwardly of the sensor housing through one side of the sensor housing.

A fitting groove may be formed at the portion of the shaft protruded outwardly of the sensor housing, and a bearing is fitted around the fitting groove.

The electronic parking brake may further include a holder coupled, at one end thereof, with the nut member while enclosing, at the other end thereof, the bearing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
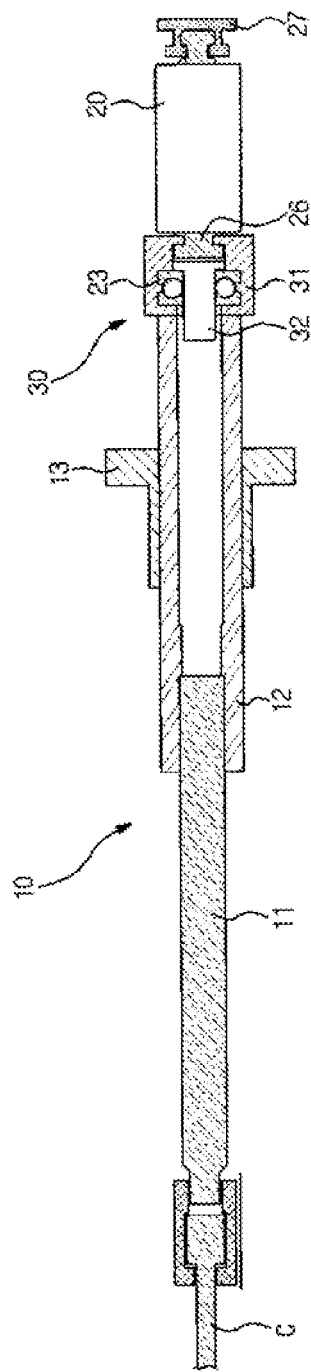
FIG. 1 is a sectional view illustrating a coupled state of a power conversion unit and a force sensor in a conventional electronic parking brake.

Reference will now be made in detail to the preferred embodiments of the present invention, examples of which are illustrated in the accompanying drawings. It should be understood that the terms used in the specification and appended claims should not be construed as limited to general and dictionary meanings but be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications can be made without departing from the spirit of the invention.

Figure 3:
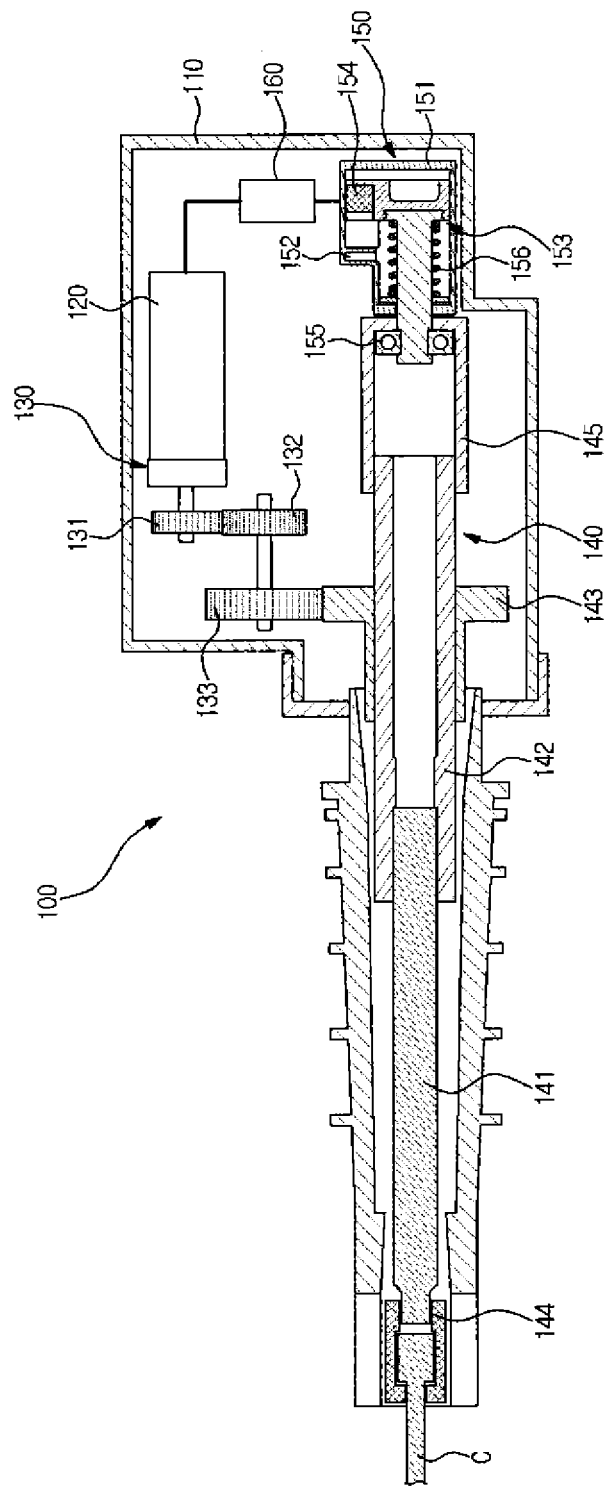
FIG. 3 is a sectional view schematically illustrating an electronic parking brake according to an exemplary embodiment of the present invention.

FIG. 3 is a sectional view schematically illustrating an electronic parking brake according to an exemplary embodiment of the present invention.

Referring to FIG. 3, the electronic parking brake, which is designated by reference numeral "100", includes a parking cable C connected to a brake to apply brake force to wheels of a vehicle (not shown), and a motor 120 to generate driving force to actuate the parking cable C. The electronic parking brake 100 also includes a reduction gear unit 130 connected to the motor 120, to reduce rotation speed of the motor 120 for generation of torque, a power conversion unit 140 coupled to the reduction gear unit 130, to convert rotation into rectilinear motion, and a sensor unit 150 to measure force exerted on the parking cable C.

The motor 120 is driven by electric power received from outside. Rotation force generated from the motor 120 is transmitted to the reduction gear unit 130.

The reduction gear unit 130 includes a planet gear assembly or gear train (not shown). The reduction gear unit 130 reduces rotation speed of the motor 120, for generation of higher rotation force, and outputs the resultant rotation force to a driving gear 131.

As shown in FIG. 3, an intermediate gear 132 is engaged with the driving gear 131, to rotate together with the driving gear 131. A driven gear 133 is engaged with the intermediate gear 132, to rotate together with the intermediate gear 132. Output power from the driven gear 133 is input to the power conversion unit 140, which converts rotation into rectilinear motion. That is, the driven gear 133 is engaged with a gear member 143 of the power conversion unit 140.

The power conversion unit 140 is operatively connected to the reduction gear unit 130, to pull the parking cable C or to release pulling of the parking cable C. The power conversion unit 140 includes a screw member 141, and a nut member 142 threadedly coupled to the screw member 141. The gear member 143, which is also included in the power conversion unit 140, is mounted to an outer peripheral surface of the nut member 142.

The gear member 143, which is mounted to the outer peripheral surface of the nut member 142, as described above, is engaged with the driven gear 133, to receive driving force from the motor 120 via the reduction gear unit 130.

The screw member 141 is connected, at one end thereof, to the parking cable C by a connecting member 144. As described above, the screw member 141 is threadedly coupled to the nut member 142. For this coupling, the screw member 141 is formed, at an outer surface thereof, with male threads.

The nut member 142 has a hollow structure having an axial hole. The nut member 142 is formed with female threads at an inner surface of the axial hole, for thread coupling thereof with the nut member 142. The screw member 141 threadedly coupled with the nut member 142 actuates the parking cable C while moving relative to the nut member 142. As shown in FIG. 3, the sensor unit 150 is connected to the nut member 142 at an end of the nut member 142 opposite to the screw member 141.

Figure 4:
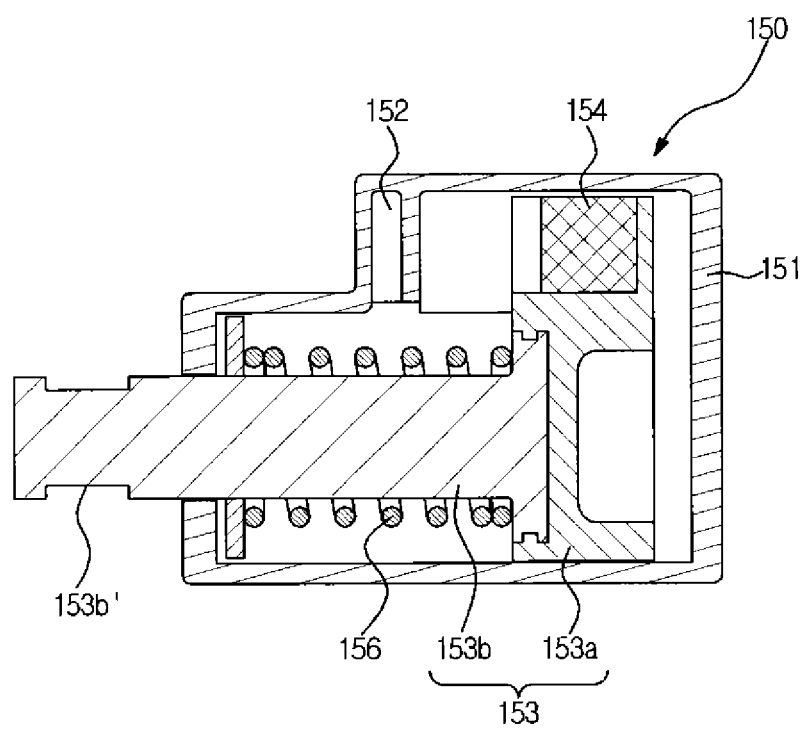
FIG. 4 is a sectional view illustrating a sensor unit according to an exemplary embodiment of the present invention.

The sensor unit 150 detects intensity of force exerted on the parking cable C in accordance with operation of the power conversion unit 140, and transmits a signal representing the detected result to the electronic control unit 160. In accordance with an exemplary embodiment of the present invention, as shown in FIG. 4, the sensor unit 150 includes a sensor housing 151, a magnet housing 153, and an elastic member 156. The magnet housing 153 is connected with a holder 145 coupled to the nut member 143. A coupling structure between the holder 145 and the magnet housing 153 will be described later.

The sensor housing 151 is fixed to an actuator housing 110, which forms an outer appearance of the electronic parking brake 100. A Hall IC 152 is installed in the sensor housing 151, to sense variation of magnetic force caused by displacement of a magnet 154.

The magnet housing 153 is movable within the sensor housing 151. In more detail, the magnet housing 153 includes a magnet support 153a to support the magnet 154, which generates a magnetic field. The magnet 154 is mounted at an upper portion of the magnet support 153a. The magnet housing 153 also includes a shaft 153b having a portion protruded outwardly of the sensor housing 151 through one side of the sensor housing 151. That is, the magnet housing 153 is movable within the sensor housing 151 in an extension direction of the shaft 153b through the sensor housing 151. In this case, the elastic member 156 is arranged between the magnet housing 153 and the sensor housing 151 and, as such, the magnet housing 153 is elastically supported by the elastic member 156.

For such movement of the magnet housing 153, a bearing 155 is installed at the holder 145. The bearing 155 is fitted around a fitting groove 153b' formed at the portion of the shaft 153b protruded through the sensor housing 151. The bearing 155 functions to convert rotation and axial displacement into rectilinear motion. In accordance with this structure, as shown in FIG. 3, the magnet housing 153 is coupled to the holder 145, which is coupled to the nut member 142. One end of the holder 145 is coupled to an end of the nut member 142 opposite to the screw 141 and, as such, the holder 145 is rotatable together with the nut member 142. The other end of the holder 145 holds the bearing 155 while enclosing the protruded portion of the shaft 153b and bearing 155. Accordingly, when the nut member 142 moves relative to the screw member 141, the magnet housing 153 connected to the holder 145 is moved together with the nut member 142.

Hereinafter, operation of the sensor unit 150 to measure brake force of the parking cable C generated upon braking using the electronic parking brake 100 having the above-described configuration will be described.

Figure 5:
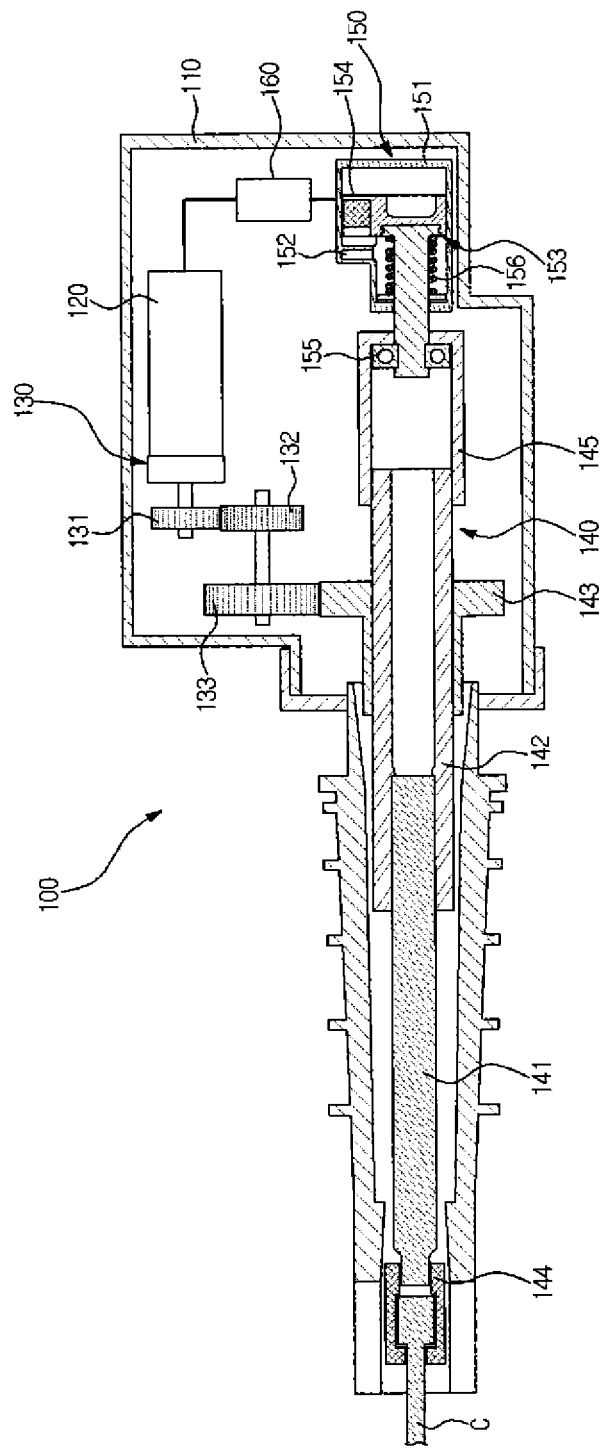
FIG. 5 is a sectional view illustrating operation of the sensor unit according to the illustrated embodiment of the present invention.

When the motor 120 operates, rotation force generated from the motor 120 is transmitted to the power conversion unit 140 via the reduction gear unit 130. The power conversion unit 140 converts rotation into rectilinear motion. That is, as shown in FIG. 5, when the nut member 142 rotates, the screw member 141 threadedly coupled to the nut member 142 is inserted into the nut member 142, thereby pulling the parking cable C connected to the screw member 141. At the same time, the nut member 142 is moved in a direction opposite to the movement direction of the screw member 141 by the same displacement as that of the screw member 141.

As result, the holder 145 coupled to the end of the nut member 142 opposite to the screw member 141 and the magnet housing 153 connected to the holder 145 are moved while compressing the elastic member 156. In this case, movement of the magnet housing 153 may be easily achieved during movement of the nut member 142 because rotation and axial displacement are converted into rectilinear movement by the bearing 155.

Meanwhile, since the sensor housing 151 is fixed to the actuator housing 110, the Hall IC 152 senses variation of magnetic force caused by displacement of the magnet 154 occurring when the magnet housing 153 moves, thereby detecting intensity of force exerted on the parking cable C. The Hall IC 152 transmits a detect signal representing the detected result to the electronic control unit 160 which, in turn, controls driving of the motor 120 in accordance with the detect signal.

Upon releasing braking, the nut member 142 and screw member 141 are moved in an opposite direction to that of braking in accordance with reverse rotation of the motor 120. As a result, the magnet housing 153 is easily returned to an original position thereof by elastic force of the elastic member 156.

Figure 2:
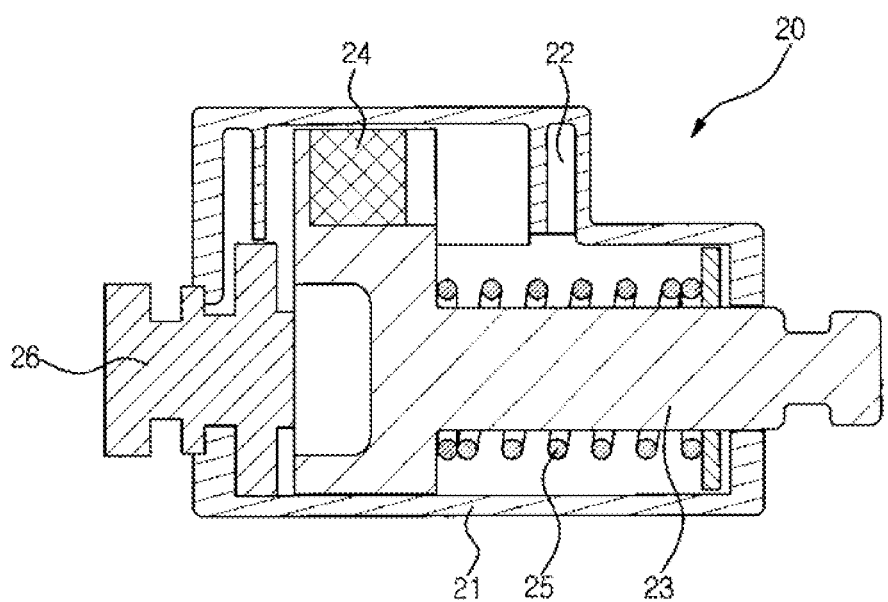
FIG. 2 is a sectional view schematically illustrating a conventional force sensor.

Thus, the sensor unit 150 according to the illustrated embodiment of the present invention has an improved structure in which intensity of force exerted on the parking cable C is measured, based on displacement of the magnet housing 153. Also, the structure of the sensor unit 150 is simple, as compared to the conventional force sensor ("20" in FIG. 2) in that the sensor unit 150 performs the function of the conventional bearing module ("30" in FIG. 1) to convert, into rectilinear motion, rotation and axial displacement caused by rotation and movement of the nut member 142. In addition, the sensor unit 150 according to the illustrated embodiment of the present invention solves problems occurring in the conventional case in which a separate fixing member ("27" in FIG. 1) is used to fix a magnet housing ("23" in FIG. 2), so that the structures of the sensor housing and the housing structure of the electronic parking brake are complicated.

As apparent from the above description, in accordance with the illustrated embodiments of the present invention, in the sensor unit to measure brake force applied to the parking cable and the electronic parking brake including the same, displacement is carried out by the magnet housing, in place of the sensor housing, and the function of the conventional bearing module separately installed to convert rotation and axial displacement into rectilinear motion is added to the sensor unit. Accordingly, the sensor unit may have an optimal structure. Accordingly, the sensor structure may be simplified. Also, it is unnecessary to use a separate element to fix the magnet housing. As a result, it may be possible to reduce the number of constituent elements and the manufacturing cost. The assembly process may also be simplified.

In accordance with the reduced number of constituent elements, the total length of the sensor unit is reduced. As a result, the sliding region of the parking cable may be increased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sensor unit for detecting intensity of force exerted on a parking cable upon braking a vehicle, the sensor unit comprising:

a sensor housing, in which a Hall IC is installed to sense variation of magnetic force caused by displacement of a magnet;

a magnet housing arranged to be movable within the sensor housing, the magnet being installed in the magnet housing, wherein the force exerted on the parking cable causes the parking cable to move a distance in a direction, and also causes the magnet to move the distance in the direction; and an elastic member arranged between the magnet housing and the sensor housing, to elastically support the magnet housing, wherein the magnet housing is coupled to a power conversion unit to operate for pulling of the parking cable or release of the pulling, wherein the magnet housing comprises:

a magnet support, at which the magnet is installed, comprising a first rectangular protrusion and a second rectangular protrusion; and a shaft coupled to the magnet support and encompassed by the elastic member, the shaft comprising:

a first rectangular groove engaged with the first rectangular protrusion;

a second rectangular groove engaged with the second rectangular protrusion;

a portion protruded outwardly of the sensor housing through one side of the sensor housing; and a fitting groove at the portion protruded outwardly of the sensor housing, wherein a bearing is fitted around the fitting groove.

2. An electronic parking brake, comprising:

a parking cable connected to a brake to apply brake force to wheels of a vehicle;

a motor to generate driving force to actuate the parking cable;

a reduction gear unit connected to the motor, to reduce rotation speed of the motor, for generation of torque;

a power conversion unit comprising a screw member, to which the parking cable is connected, a nut member to move along an axial direction of the screw member relative to the screw member, and a gear member coupled to an outer peripheral surface of the nut member and connected to the reduction gear unit, to rotate together with the nut member; and a sensor unit connected to the power conversion unit, to measure the brake force applied to the parking cable, wherein the sensor unit comprises:

a sensor housing, in which a Hall IC is installed to sense variation of magnetic force caused by displacement of a magnet;

a magnet housing arranged to be movable within the sensor housing, the magnet being installed in the magnet housing, wherein the force exerted on the parking cable causes the parking cable to move a distance in a direction, and also causes the magnet to move the distance in the direction; and an elastic member arranged between the magnet housing and the sensor housing, to elastically support the magnet housing, wherein the magnet housing comprises:

a magnet support, at which the magnet is installed, comprising a first rectangular protrusion and a second rectangular protrusion; and a shaft coupled to the magnet support and encompassed by the elastic member, the shaft comprising:

a first rectangular groove engaged with the first rectangular protrusion;

a second rectangular groove engaged with the second rectangular protrusion;

a portion protruded outwardly of the sensor housing through one side of the sensor housing; and a fitting groove at the portion protruded outwardly of the sensor housing, and, wherein a bearing is fitted around the fitting groove.

3. The electronic parking brake according to claim 2, further comprising:

a holder coupled, at one end thereof, with the nut member while enclosing, at the other end thereof, the bearing.

4. The sensor unit according to claim 1, wherein the magnet moves collinearly with respect to the Hall IC when the force is exerted on the parking cable.

5. The electronic parking brake according to claim 2, wherein the magnet moves collinearly with respect to the Hall IC when the force is exerted on the parking cable.

* * * * *